(12) United States Patent
Kato et al.

(10) Patent No.: US 7,319,893 B2
(45) Date of Patent: Jan. 15, 2008

(54) SLIDING MECHANISM AND MOBILE TERMINAL

(75) Inventors: Hideo Kato, Kanagawa (JP); Taichi Nishihara, Kanagawa (JP)

(73) Assignee: Katoh Electrical Machinery Co., Ltd., Yokohama, Kanagawa (JP)

( * ) Notice: Subject to any disclaimer, the term of this patent is extended or adjusted under 35 U.S.C. 154(b) by 455 days.

(21) Appl. No.: 10/995,710

(22) Filed: Nov. 23, 2004

(65) Prior Publication Data

US 2005/0119034 A1    Jun. 2, 2005

(30) Foreign Application Priority Data

Dec. 1, 2003    (JP)    ............... 2003-401808

(51) Int. Cl.
*H04M 1/00*    (2006.01)
(52) U.S. Cl. ............... 455/575.4; 455/550.1; 379/433.12
(58) Field of Classification Search ............ 455/575.4, 455/550.1, 90.3, 575.1, 575.8, 66.1; 379/433.12, 379/433.01, 433.11
See application file for complete search history.

(56) References Cited

U.S. PATENT DOCUMENTS

| | | | | |
|---|---|---|---|---|
| 5,956,625 | A * | 9/1999 | Hansen et al. ............ | 455/575.4 |
| 6,073,027 | A * | 6/2000 | Norman et al. ........... | 455/575.4 |
| 6,151,485 | A * | 11/2000 | Crisp ....................... | 455/575.4 |
| 6,282,436 | B1 * | 8/2001 | Crisp ....................... | 455/575.4 |
| 6,728,558 | B1 * | 4/2004 | Kubo et al. ............... | 455/575.4 |
| 6,733,005 | B2 * | 5/2004 | Kauhaniemi et al. ....... | 267/156 |
| 6,842,626 | B1 * | 1/2005 | Kubo et al. ............... | 455/550.1 |
| 6,947,778 | B2 * | 9/2005 | Tsai ......................... | 455/575.4 |
| 6,980,840 | B2 * | 12/2005 | Kim et al. ................ | 455/575.4 |

FOREIGN PATENT DOCUMENTS

JP    2003-125052    4/2003

* cited by examiner

*Primary Examiner*—Sonny Trinh
(74) *Attorney, Agent, or Firm*—Notaro & Michalos P.C.

(57) ABSTRACT

A mechanism for sliding relatively in the longitudinal direction the first case and the second case in their superposed state in order to provide a sliding mechanism for mobile terminals that can be produced at a low cost wherein the use of a single sliding module is sufficient, the total length of this sliding module can be shortened to avoid its exposure from the case during use, the locking plate and the sliding cover that constitute the sliding case of the sliding module are not welded but are simply engaged so that the entire construction of the sliding mechanism may be simplified. This sliding mechanism includes a pair of engaging grooves provided on the surface or at specified intervals in the longitudinal direction of both sides of any one of the first case or the second case, a pair of sliding parts provided on any other one of the first case and the second case engaged slidably with these engaging grooves, a sliding module fixed on any one of the first case or the second case, a sliding case comprising a sliding cover and a locking plate wherein this sliding module is mutually superposed and fixed, a slider slidably housed by pressurized contact in this sliding case, a locking means provided between this slider and the sliding case, and a fixing pin fixed on the slider and piercing through a guiding long hole provided on the sliding case and protruding out of the sliding case, wherein this fixing pin is fixed on any other one of the first case or the second case.

10 Claims, 12 Drawing Sheets

SLIDING MECHANISM AND MOBILE TERMINAL

BACKGROUND OF THE INVENTION

1. Field of the Invention

The present invention relates to a sliding mechanism and a mobile terminal suitable to be used for slidably connecting the first case for the transmitting part and the second case for the receiving pat of a mobile terminal such as, in particular, a Cellphone handset.

2. Description of Related Art

Cellphone handsets, a type of mobile terminal, wherein the first case for the transmitting part consisting of a keyboard part and a microphone part and the second case for the receiving part consisting of a display part and a speaker part are superposed in such a manner that the second case cover the first case when they are superposed completely and the second case is allowed to slide along the longitudinal axis of the upper surface of the first case to create an exposed space on the upper surface of the first case are now available on the market with a sliding mechanism. Such a sliding mechanism was published in the Japanese Patent Application Laid Open 2003 125052 and is generally known.

The invention described in this Japanese patent application laid open is constituted by two sliding modules each consisting of a sliding case in which a sliding cover and a locking plate are superposed and fixed and a slider slidably housed on this sliding case are disposed in parallel on the bottom surface of the second case, and two fixing pins are provided in a protruding condition from the slider to be fixed by a screw to the upper surface of the first case.

Such being the construction, since the load of the second case weighs on the sliding case through the slider when the second case is forced to slide to expose the upper surface of the first case, on actual product it is necessary to spot weld at a plurality of points between the lock plate and the sliding cover constituting the sliding case, and in order to maintain strength and to prevent rotations in the horizontal direction during the use of the second case, it is necessary to provide two fixing pins for fixing the slider. This leads to a higher cost and the necessity of a longer sliding case. And there developed an esthetic problem of the sliding case being exposed on the bottom surface of the second case at the time of the slide.

SUMMARY OF THE INVENTION

The object of the present invention is to provide a sliding mechanism of a mobile terminal and a mobile terminal wherein only one sliding module is sufficient, the total length of this sliding module is shortened so that there may be no exposure from the case during use, the lock plate and the sliding cover constituting the sliding case of the sliding module are incorporated in such a way that they need not be welded together but only be engaged so that as a whole the sliding mechanism may be of a simple construction, may be produced at a low cost, and may present other effects and actions described below.

In order to achieve the object mentioned above, one aspect of the present invention resides in a mechanism of sliding in the relatively longitudinal direction the first case and the second case while they are bound above and below including a pair of engaging grooves provided in the longitudinal direction of any one of the first case and the second case mentioned above, a sliding part provided in any other of the first case or the second case mentioned above engaged slidably with this engaging groove, a sliding module fixed on any one of the first case or the second case, a sliding case consisting of a sliding cover and a locking plate into which this sliding module is fixed in a mutually bound state, a slider slidably housed in a pressurized condition in this sliding case, a locking means provided between this slider and the sliding case, a fixing pin fixed to the slider mentioned above and piercing through a guiding long hole provided on the sliding module to protrude out of the sliding case, the fixing pin being fixed on any other one of the first case or the second case.

In the aspect, the present invention can limit the number of the sliding modules to one or fix the sliding module to the first case.

In the aspect, the present invention can also provide a leaf spring between the slider and the sliding case mentioned above.

In the aspect, the present invention can further adopt the locking means mentioned above the convex engagement system of the convex-concave engagement system between the slider mentioned above and the sliding scale mentioned above.

In the aspect, the present invention can in addition apply a lubricating coating film on the sliding surface of the whole or a part of the slider, leaf spring and sliding case mentioned above.

In the aspect, the present invention can turn the first section and the second section mentioned above respectively into the transmitting part and the receiving part of the Cellphone handset.

In the aspect, the present invention inserts the sliding module into a receiving concave provided in the case cover of the first case or the second case, and its both ends are inserted and fixed in the fixing concave provided in this receiving concave.

In the aspect, the present invention uses the sliding mechanism as a mobile terminal.

Due to the configuration described above, the present invention can produce the following effects.

The first case and the second case placed mutually one above the other can slide mutually in one direction stably stoppably at any position, and in addition a pair of engaging grooves provided in the longitudinal direction of any one of the first case or the second case mentioned above and a sliding part provided on any other one of the first case or the second case engaged slidably with this engaging groove enable even a sliding module and a fixing pin withstand sufficiently the load of the first case and the second case mentioned above that falls in the bending direction while sliding. Moreover, due to the reduction of the number of fixing pins to one, it has become possible to shorten the length of the sliding module, and to prevent the sliding module to expose outside while sliding.

Other and further objects, features and advantages of the invention will appear more fully from the following description.

DETAILED DESCRIPTION OF THE PREFERRED EMBODIMENTS

The following is the description of an embodiment of the present invention as carried out on a Cellphone handset. However, the sliding mechanism according to the present invention can be carried out on personal digital assistants (PDA) such as ZAURUS (trade mark), electric calculators, pocket computers, handheld gaming devices, ash trays, lid for case, and the like.

Figure 1:
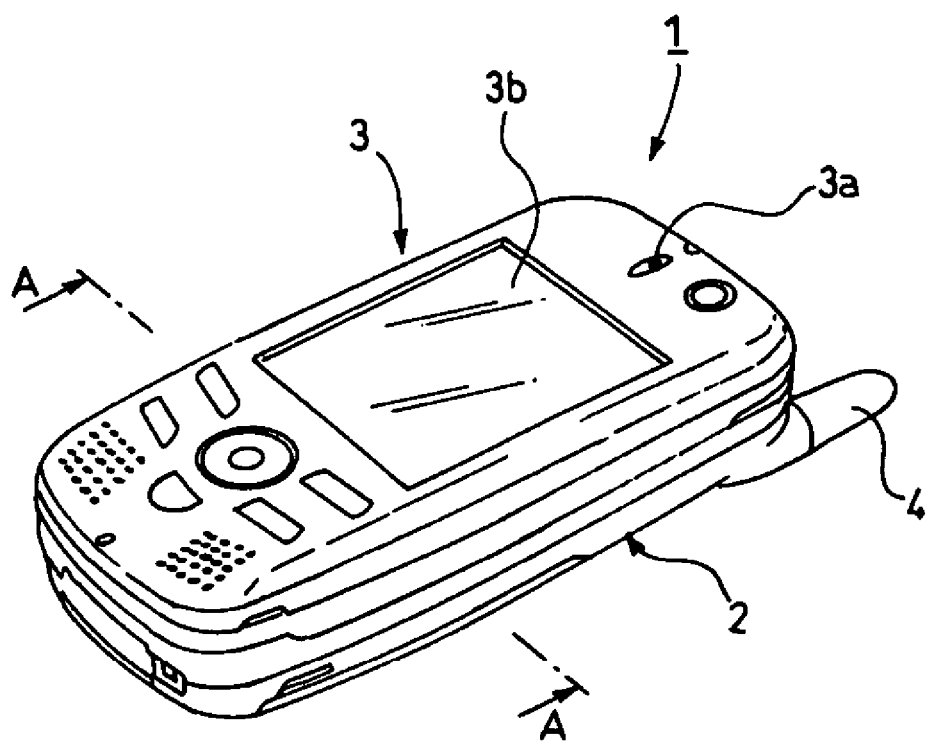
FIG. 1 is a perspective view of the superposed state of the first case constituting a transmitter part and the second case constituting a receiving part of a Cellphone handset, a type of mobile terminal to which the present invention is applied.
Figure 2:
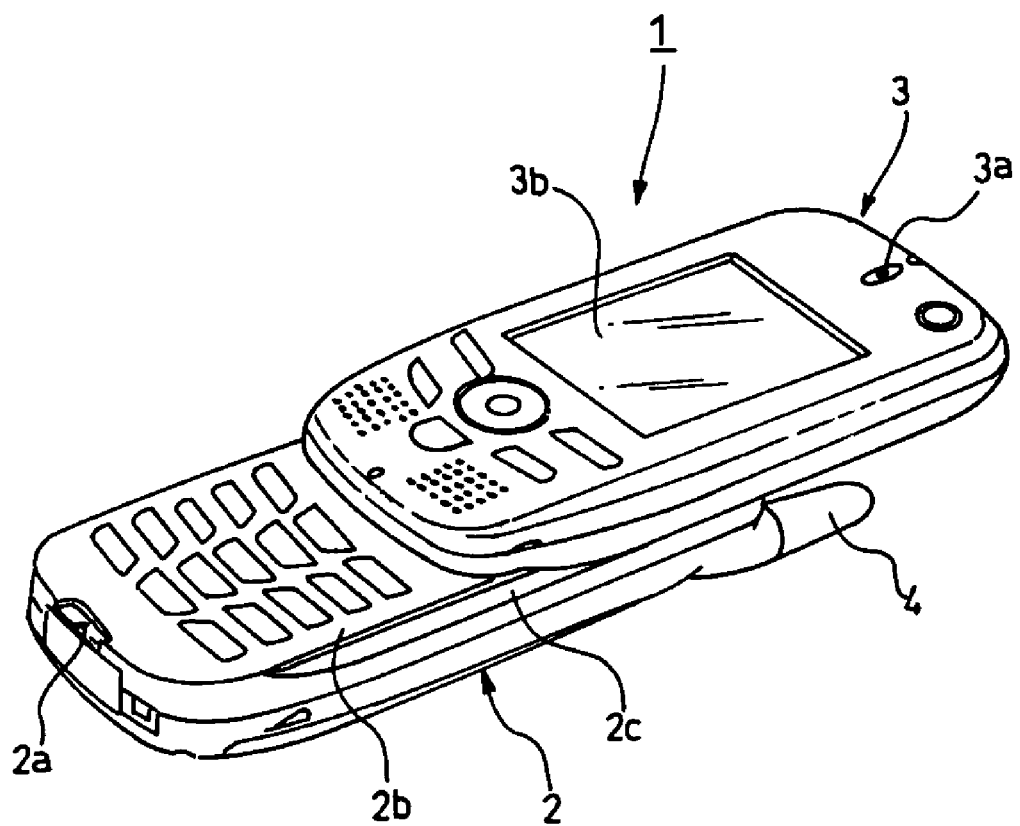
FIG. 2 is a perspective view of the Cellphone handset described in FIG. 1 in which the transmitting part and the receiving part have moved apart mutually.
Figure 3:
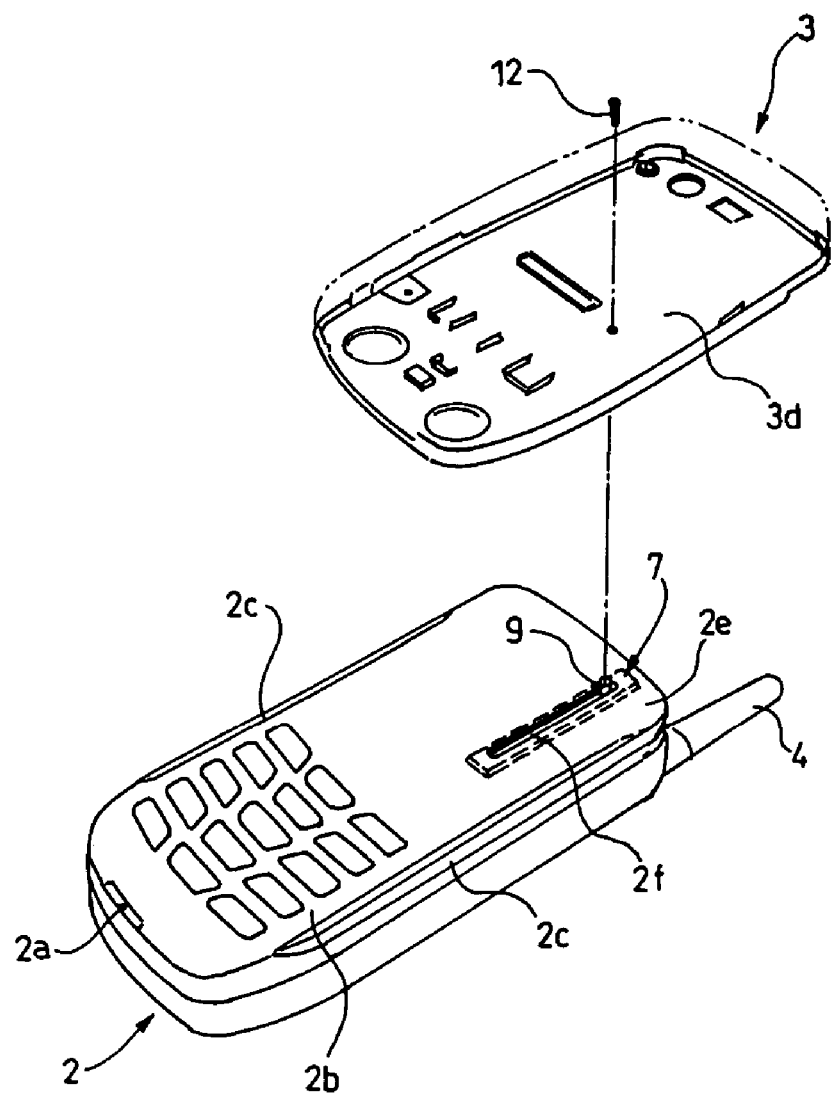
FIG. 3 is a partial perspective view describing the sliding mechanism part of the mobile terminal related to the present invention.
Figure 9:
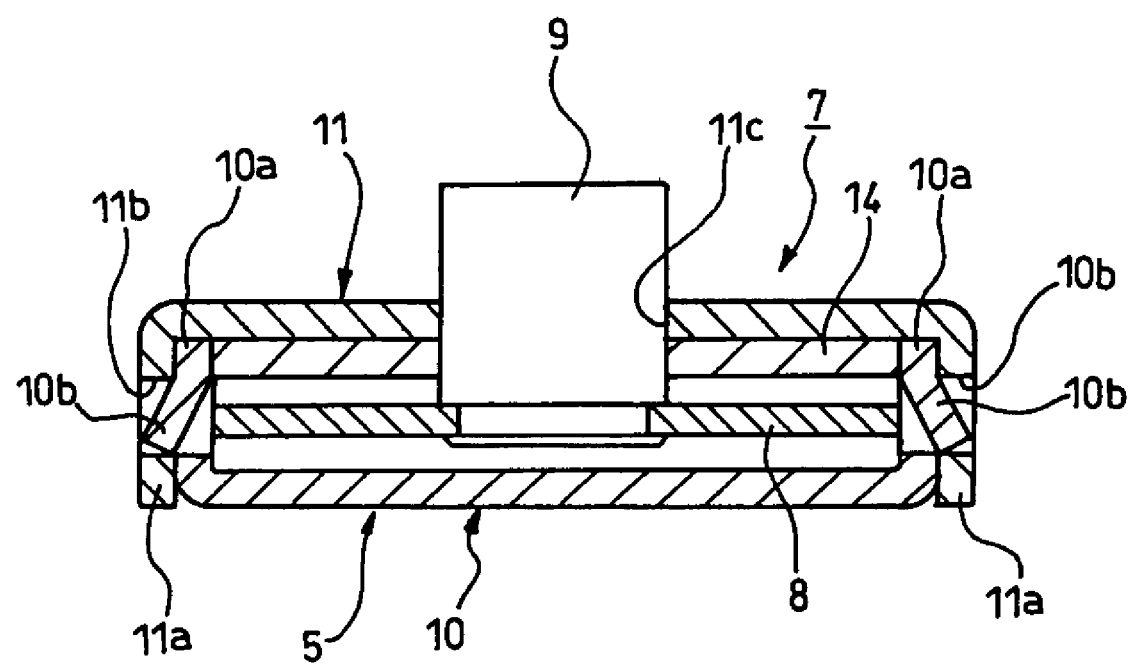
FIG. 9 is a partial enlarged vertical sectional view of the sliding module of the mobile terminal according to the present invention.

The drawings describe in detail a mode carrying out the present invention with reference to FIGS. 1 and 9. The indicative symbol 2 in FIGS. 1 to 3 in particular represents for example the transmitting part of a Cellphone handset 1 that constitutes the first case. On the surface of this first case 2, a microphone part 2a and a keyboard part 2b are provided, and superposed and slidably fixed in the longitudinal direction of the first case 2 is, for example, the receiving part of the Cellphone handset 1 constituting the second case 3. On the surface of this second case 3, a speaker part 3a and a display part 3b are provided. Incidentally, the indicative symbol 4 represents an antenna. This antenna 4, fixed on the first case 2, can also be fixed on the second case 3.

Figure 4:
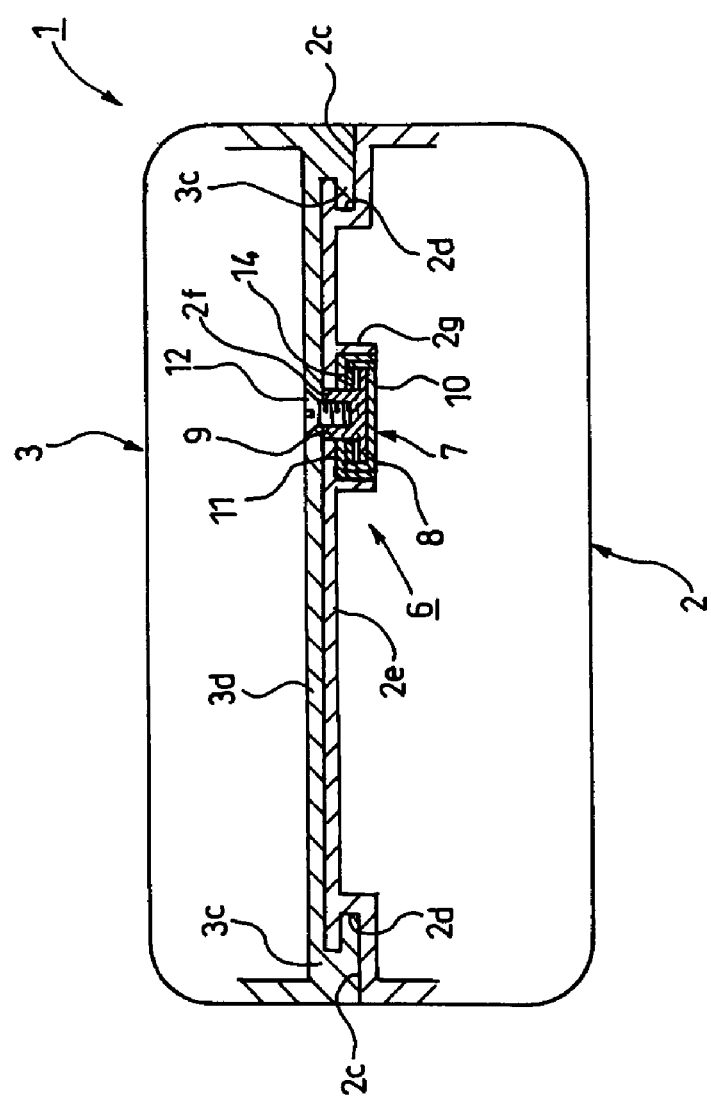
FIG. 4 is a sectional view along the line A-A of FIG. 1.

As shown in FIG. 4, particularly on both sides of the upper surface of the first case 2, racks 2c and 2c are provided, and grooves 2d and 2d engaging therewith are also provided. On both sides of the bottom of the second case 3, sliding parts 3c and 3c are provided in roughly C section in sliding contact with the racks 2c and 2c, and these sliding parts 3c and 3c are engaged slidably with the engaging grooves 2d and 2d.

Then, the indicative symbol 7 represents a sliding module. This sliding module 7, as FIG. 5 shows particularly, are fixed on the back of the upper cover 2e of the first case 2, and the fixing pin 9 provided so as to protrude from the slider 8 slidably housed in the sliding case 5 that constitutes the sliding module 7 protrudes upwards through a guiding long hole 28 provided in the upper cover 2e, and this fixing pin 9 is fixed on the bottom cover 3d of the second case 3 through a fixing screw 12.

Figure 5:
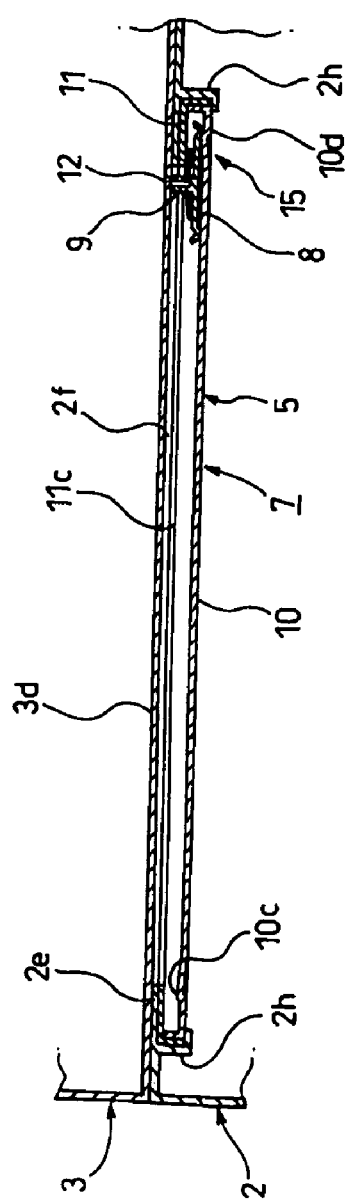
FIG. 5 is an enlarged vertical sectional view describing how the sliding module of the mobile terminal according to the present invention is fixed.
Figure 6:
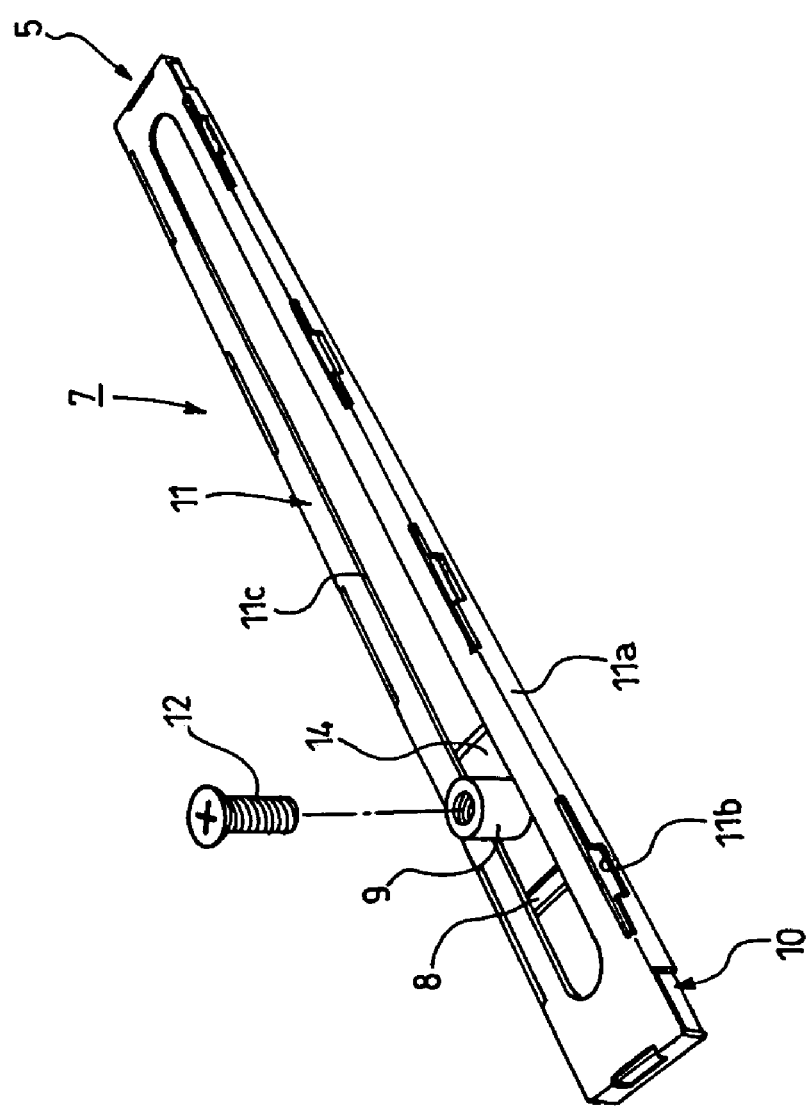
FIG. 6 is an exploded perspective view of the sliding mechanism of the mobile terminal according to the present invention.

And the method of fixing the sliding module 7 to the upper cover 2e is, as FIG. 5 shows in particular, to form a catching part 2g on the back of the upper cover 2e, to provide locking concaves 2h and 2h on the front part of the rear part of this catching part 2g, and to insert fit both ends of the sliding module 7 received by the catching part 2g in the locking concaves 2h and 2h.

The construction of this sliding module 7 is shown in particular in FIGS. 6 to 9. According to the drawings, the indicative symbol 10 represents a locking plate, and locking slips 10b, 10b . . . are provided on a plurality of rising slips 10a, 10a . . . rising at fixed intervals from the surrounding members, and locking convexes 10c and 10d are provided in an orthogonal direction to the locking plate on both ends in its longitudinal direction.

Incidentally, although the figures show an embodiment with only one sliding module 7 mentioned above, two or more of them can be used.

The indicative symbol 11 represents a sliding cover. A plurality of locking holes 11b, 11b . . . engaging with the locking slips 10b, 10b . . . are provided on the hanging slips provided around it, and the locking plate 10 is covered with the sliding cover 11 and each locking slip 10b is engaged with each locking hole 11b to build a solid structure.

In the sliding case 5 constituted by the locking plate 10 and the sliding cover 11, a plate-shaped slider 8 is fixed slidably, and this slider 8 include convexes 8a and 8b formed at the center thereof and in the direction orthogonal to the slider 8 on both ends in the longitudinal direction. This slider 8 is also fixed with pressurized contact by a leaf spring 14 between the locking plate 10 and the sliding cover 11 constituting the sliding case 5. And as shown in FIG. 8 in particular, the locking convexes 10c and 10d of the locking plate 10 and the concaves 8a and 8b of the slider 8 constitute the locking means 15.

Figure 7:
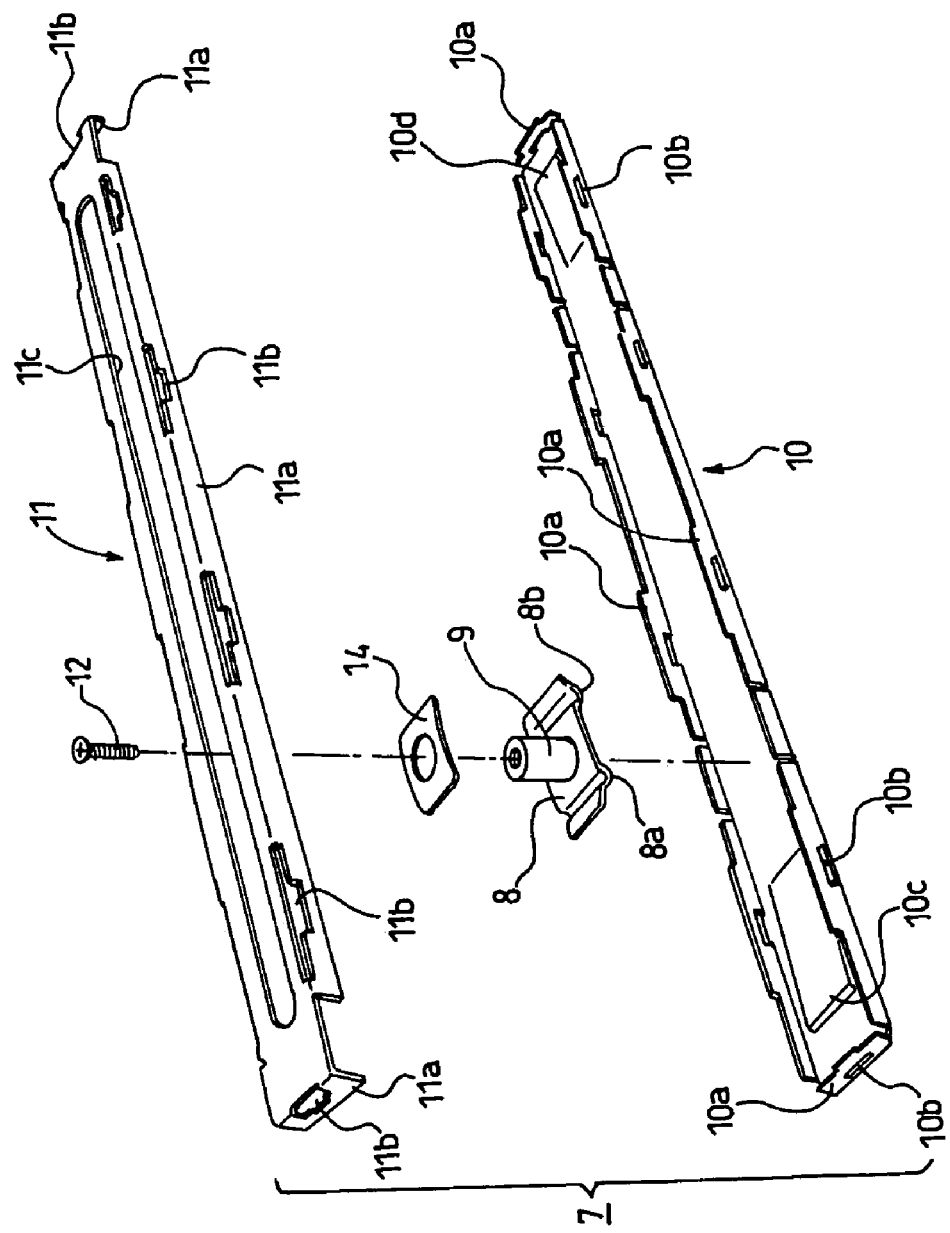
FIG. 7 is an exploded perspective view of the sliding module of the mobile terminal according to the present invention.
Figure 8:
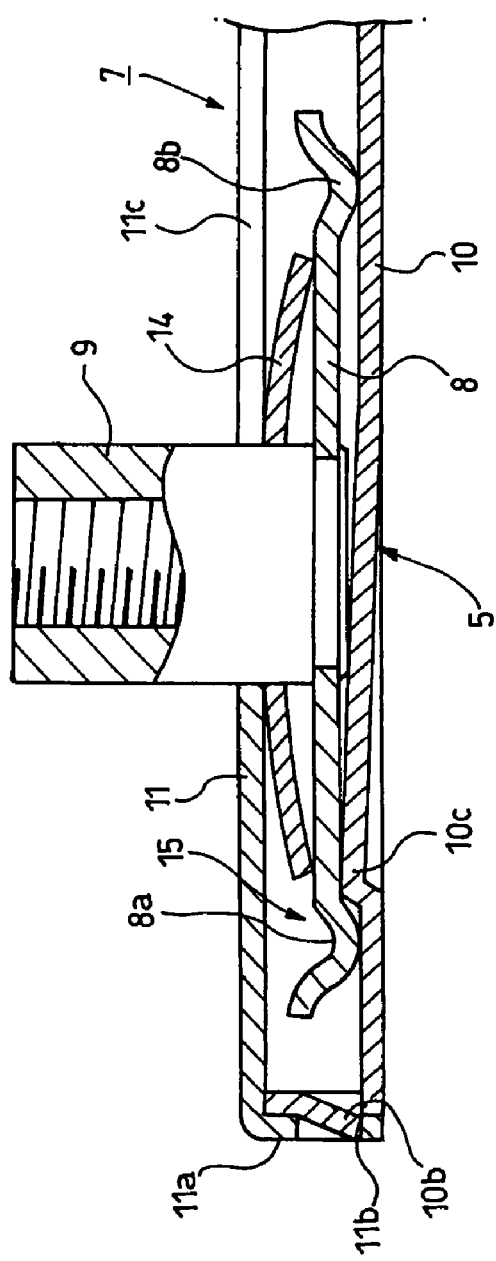
FIG. 8 is a partial enlarged longitudinal sectional view of the sliding module of the mobile terminal according to the present invention.

As shown in FIGS. 7 to 9, a leaf spring 14 is provided in roughly C section. It is fitted to a fixing pin 9 by allowing the latter to pass through a central portion thereof. The leaf spring 14 is resiliently provided between a sliding cover 11 and a slider 8, with end portions thereof abutting said slider 8 with a central abutting said sliding cover 11.

As described above, a fixing pin 9 is fixed to this slider 8 through the leaf spring 14. This fixing pin 9 pierces through a guiding long hole 11c provided on the sliding cover 11 and another guiding long hole 2f provided on the upper cover 2e of the first case 2 to thrust out. And the fixing pin 9 is fixed, as described above, by a fixing screw 12 on the bottom cover 3d on the side of the second case 3. In this way, the engaging grooves 2d and 2d, the sliding parts 3c and 3c, and the sliding module 7 constitute the sliding mechanism 6.

And now the functions of the sliding mechanism according to the present invention will be described below. When the first case 2 and the second case 3 are in a closed position of both of them lying one on the other, the convex 8a provided on one end of the slider 8 in the sliding case 5 is engaged with the locking convex 10c provided at one end of the locking plate 10, and both are in a locked state.

Therefore, unless an outside force is applied, the first case 2 and the second case 3, in other words the transmitting part and the receiving part do not slide naturally. When the object of carrying out the present invention is a Cellphone handset as shown in the figure, the first case 2 constituting the transmitting part and the second case 3 constituting the receiving part are in this state constituted in a compact form, can be easily stored and held, present no risk of the operating keys being pressed while the whole product is carried, and in addition enables anyone to view the image and information displayed on the display device 3b provided on the second case 3 side in this state. And due to the engagement of the sliding parts 3c and 3c with the engaging grooves 2d and 2d, the first case 2 and the second case 3 are inseparably engaged mutually by this engaging means other than the sliding module 7.

And when the first case 2 and the second case 3 are made to slide relatively further in the longitudinal direction, the convex 8a of the slider 8 is unlocked from the locking convex 10c of the locking plate 10, and the slider 8 in the sliding case 5 slides in the sliding case 5 by pressurized contact due to the elasticity of the leaf spring 14. Therefore, the first case 2 and the second case 3 can be made to slide mutually to stop at any desired position.

When the first case 2 and the second case 3 are made to slide further relatively, the convex 8b provided at another end of the slider 8 engages with the locking convex 10d provided at another end of the locking plate 10, and at the same time a side of the fixing pin 9 enters into contact with an end of the guiding long hole 11c provided on the sliding cover 11, and here again the first case 2 and the second case 3 are mutually locked.

In this state, the keyboard part 2b of the transmitting part becomes exposed, and the whole set is ready to be used as a Cellphone handset. Or, even if the first case 2 and the second case 3 are not made to slide completely, sometimes the whole set is ready to be used. Moreover, even if an outside force is applied to bend the second case 3 to the back at this state, the first case and the second case are mutually engaged by the sliding parts 3c and 3c engaged with the engaging groove 2d and 2d, and therefore the load in this bending direction does not weigh only on the sliding case 5.

Then, when the first case and the second case are made to slide each other and then are led to return to the superposed position, the convex 8b of the slider 8 is again disengaged from the locking convex 10d of the locking plate 10, and the first case 2 and the second case 3 slide stoppably at any desired position, and the convex 8a of the slider 8 and the convex 10c of the locking plate 10 return to their engaging position to be locked here. Then, the side of the fixing pin 9 gets into contact with an end of the guiding long hole 11c. However, it is possible to choose steps to ensure that an end of the slider 8 get into contact with an end of the sliding case 5 as a discretionary stopper measure at the position where the slider 8 is locked. And the guiding long hole 11c provided on the sliding cover 11 side may be provided on the locking plate 10 side.

Figure 10:
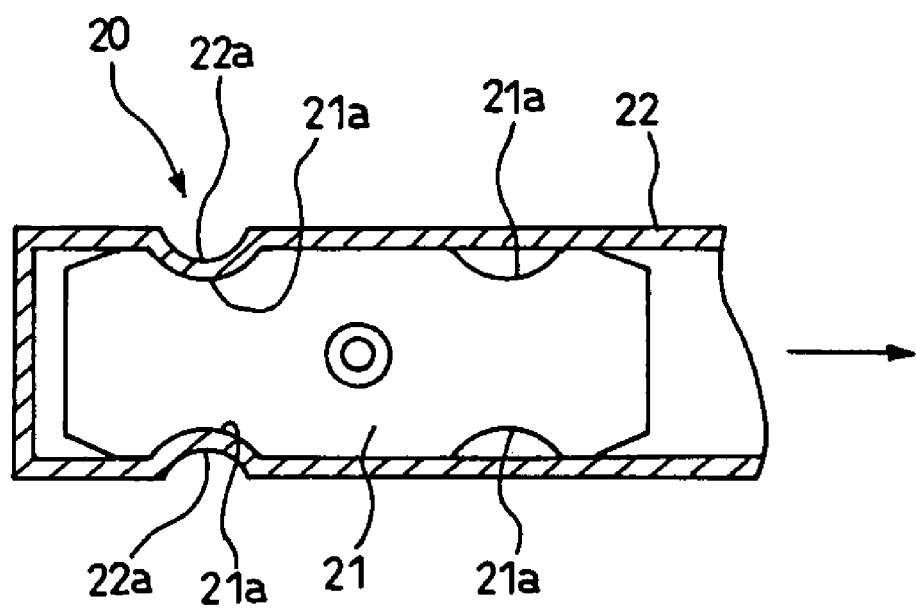
FIG. 10 is an illustration describing another embodiment of the sliding mechanism of the mobile terminal according to the present invention.

FIG. 10 shows another embodiment of the locking means, and the locking means 20 in this embodiment derives its locking action from the engagement of the concaves 21a provided on both sides of both ends of the slider 21 with the convexes 22a provided on the sides of the locking plate 22.

In each of the embodiments described above, however, the convexes and concaves provided in the locking plate may be provided on the sliding cover side, and the leaf spring 13 may intervene between the locking plate and the slider.

Figure 11:
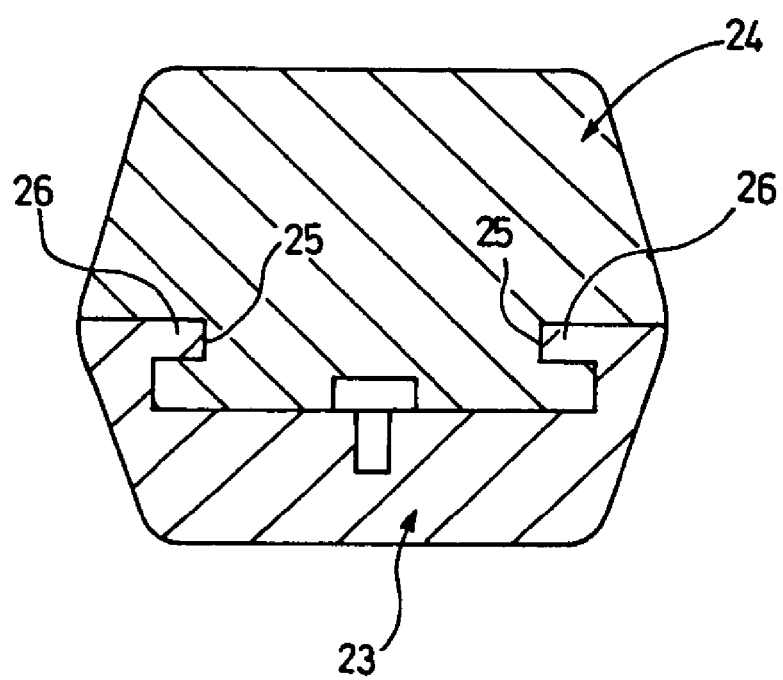
FIG. 11 is an illustration describing still another embodiment of the sliding mechanism of the mobile terminal according to the present invention.

FIG. 11 shows another embodiment of the sliding mechanism, and shows a case of reversing the position of the engaging grooves and the sliding parts provided in the first case 23 and the second case 24 from that of the embodiment 1, wherein the engaging grooves 25 are provided in the second case 24 and the sliding parts 26 engaged with these engaging grooves 25 are provided on the first case 23 side.

The object of the present invention can be achieved by such a way of carrying out.

Figure 12:
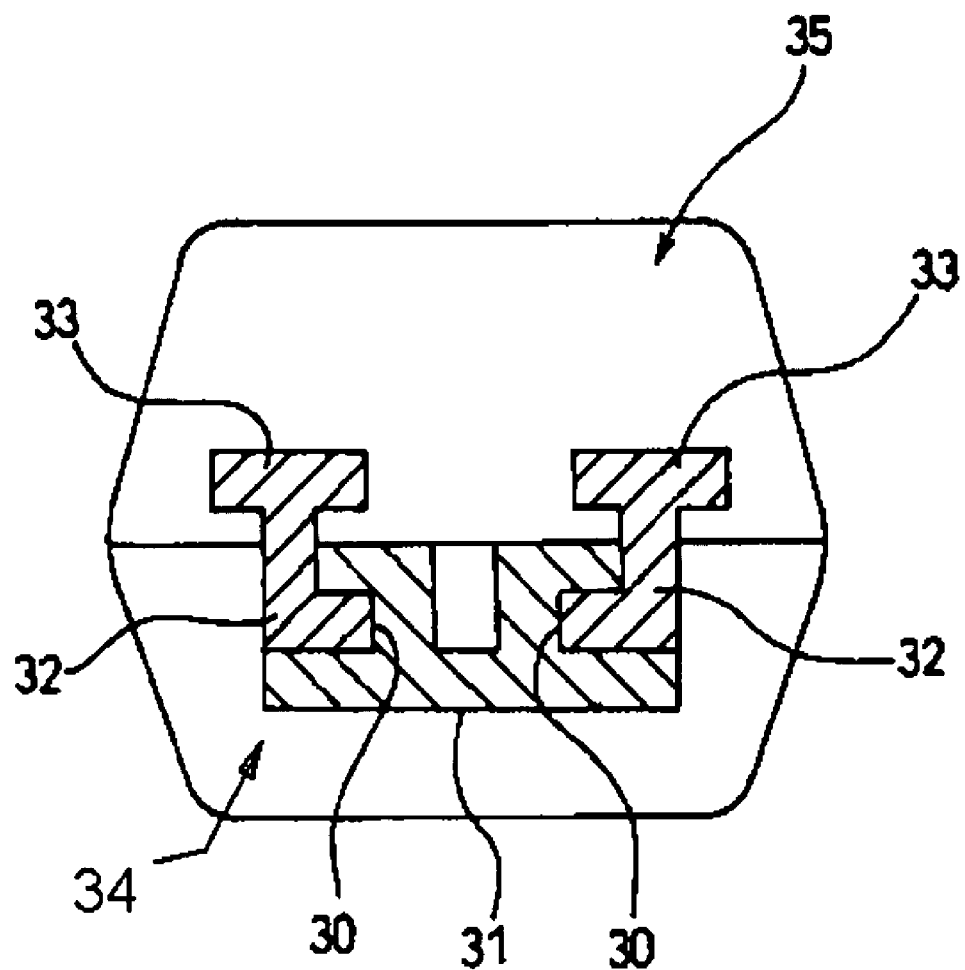
FIG. 12 is an illustration describing still another embodiment of the sliding mechanism of the mobile terminal according to the present invention.

FIG. 12 is shows still another embodiment of the sliding mechanism, wherein the engaging member 31 in which the engaging grooves 30 and 30 are provided and the sliding members 33 and 33 in each of which a sliding part 32 is provided are made of separate materials from the first case 34 and the second case 35.

The object of the present invention can be achieved by such a way of carrying out.

The present invention can be carried out for slidably connecting mutually the first case and the second case of a Cellphone handset constituting a type of mobile terminal, other personal digital assistants (PDA) such as ZAURUS (trade mark), electronic calculators, pocket computers, handheld gaming devices, ash trays, lids for case and the like.

The foregoing invention has been described in terms of preferred embodiments. However, those skilled, in the art will recognize that many variations of such embodiments exist. Such variations are intended to be within the scope of the present invention and the appended claims.

What is claimed is:

1. A mechanism of sliding relatively in the longitudinal direction the first case and the second case of a mobile terminal in their superposed state comprising
   a pair of engaging grooves provided on the surface or at specified intervals in the longitudinal direction of both sides of any one of said first case or said second case,
   a pair of sliding parts provided on any other one of said first case and said second case engaged slidably with these engaging grooves,
   a sliding module fixed on any of said first case or said second case,
   wherein said sliding module is composed of a sliding case comprising a sliding cover and a locking plate mutually superposed and fixed,
   a slider slidably housed in said sliding case,
   a locking means provided between said slider and said locking plate,
   a fixing pin fixed on said slider and piercing through a guiding long hole provided on said sliding case and protruding out of said sliding case,
   a leaf spring attached to the fixing pin and resiliently provided between said slider and said sliding case for bringing said slider into a pressurized contact with said locking plate, and
   wherein said fixing pin is fixed on any other one of said first case or said second case.

2. The sliding mechanism for mobile terminals according to claim 1, wherein the number of said sliding module is limited to one.

3. The sliding mechanism for mobile terminals according to claim 1, wherein said sliding module is fixed on the first case.

4. The sliding mechanism for mobile terminals according to claim 1, wherein a leaf spring is slightly curved and provided in roughly C section, with both ends abutting said slider and with a central portion thereof abutting said sliding cover.

5. The sliding mechanism for mobile terminals according to claim 1, wherein said locking means is a convex engagement or a concave-convex engagement provided between said slider and said sliding case.

6. The sliding mechanism for mobile terminals according to claim 1, wherein the sliding surface of all or a part of said slider, leaf spring, and sliding case is coated with a lubricant to form a lubricating coating.

7. The sliding mechanism for mobile terminals according to claim 1, wherein said first case and second case are respectively the transmitting part and the receiving part of a cell phone handset.

8. The sliding mechanism for mobile terminals according to claim 1, wherein said sliding module is inserted into a receiving concave provided on the case cover of said first case or second case and its both ends are insert locked in locking concaves provided in this receiving concave.

9. A mobile terminal wherein the sliding mechanism according to claim 1 is used.

10. The sliding mechanism for mobile terminals according to claim 1, wherein said locking means are concaves formed on both sides of said slider and convexes formed on both sides on the inner surface of said locking plate.

* * * * *